United States Patent
Frolikov

(10) Patent No.: US 12,346,748 B2
(45) Date of Patent: Jul. 1, 2025

(54) DETERMINATION OF WORKLOAD DISTRIBUTION ACROSS PROCESSORS IN A MEMORY SYSTEM

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 61 days.

(21) Appl. No.: 17/697,737

(22) Filed: Mar. 17, 2022

(65) Prior Publication Data

US 2022/0206874 A1 Jun. 30, 2022

Related U.S. Application Data

(63) Continuation of application No. 15/945,533, filed on Apr. 4, 2018, now Pat. No. 11,281,501.

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC ................. G06F 9/5083; G06F 9/4881; G06F 2209/5019
See application file for complete search history.

(56) References Cited

U.S. PATENT DOCUMENTS

| | | | |
|---|---|---|---|
| 6,292,875 B1 * | 9/2001 | Tanaka ............... | H04N 21/2318 710/1 |
| 11,281,501 B2 | 3/2022 | Frolikov | |
| 2005/0086359 A1 * | 4/2005 | Banerjee ............... | G06F 9/5027 709/232 |
| 2006/0005082 A1 | 1/2006 | Fossum et al. | |
| 2006/0259621 A1 | 11/2006 | Ranganathan et al. | |
| 2007/0233843 A1 | 10/2007 | Frey-ganzel et al. | |
| 2011/0302586 A1 * | 12/2011 | Chung ................ | G06F 13/1605 718/103 |
| 2012/0131594 A1 * | 5/2012 | Morgan ................ | G06F 9/5072 718/105 |

(Continued)

OTHER PUBLICATIONS

Title: Determination of Workload Distribution across Processors in a Memory System, U.S. Appl. No. 15/945,533, filed Apr. 4, 2018, Inventor: Alex Frolikov, Status: Patented Case, Status Date: May 24, 2021.

*Primary Examiner* — Bruce S Ashley
(74) *Attorney, Agent, or Firm* — Greenberg Traurig

(57) ABSTRACT

A memory system having a set of media, a set of resources, and a controller configured via firmware to use the set of resources in processing requests from a host system to store data in the media or retrieve data from the media. The memory system has a workload manager that analyzes activity records in an execution log for a time period where each of the activity records can indicate whether a processor of the controller is in an idle state during a time slot in the time period. The workload manager identifies idle time slots within the time period during which time slots one or more lightly-loaded processors in the plurality of processors are in the idle state, and adjusts a configuration of the controller to direct tasks from one or more heavily-loaded processors to the one or more lightly-loaded processors.

20 Claims, 4 Drawing Sheets

(56) References Cited

U.S. PATENT DOCUMENTS

| | | |
|---|---|---|
| 2012/0192200 A1 | 7/2012 | Rao et al. |
| 2013/0042123 A1* | 2/2013 | Smith ................... G06F 9/5077 |
| | | 713/300 |
| 2013/0227236 A1 | 8/2013 | Flynn et al. |
| 2015/0007185 A1 | 1/2015 | Dey et al. |
| 2017/0220384 A1 | 8/2017 | Anderson et al. |
| 2018/0018101 A1* | 1/2018 | Benisty ................. G06F 3/0659 |
| 2019/0310892 A1 | 10/2019 | Frolikov |

\* cited by examiner

DETERMINATION OF WORKLOAD DISTRIBUTION ACROSS PROCESSORS IN A MEMORY SYSTEM

RELATED APPLICATIONS

The present application is a continuation application of U.S. patent application Ser. No. 15/945,533, filed Apr. 4, 2018, entitled "Determination of Workload Distribution across Processors in a Memory System," the entire disclosure of which application is hereby incorporated herein by reference.

FIELD OF THE TECHNOLOGY

At least some embodiments disclosed herein relate to memory systems in general, and more particularly, but not limited to determination and balancing of workloads across processors in a memory system.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

The memory system can have a plurality of running processes that are executed in a plurality of processors. Different running processes can be configured to process different types of tasks; and multiple processes can run in multiple processors to perform a same type of tasks. A request from the host system can be processed by the memory system using more than one of the running processes to complete a series of tasks before a response is generated and provided from the memory system to the host system.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to the determination and balancing of workloads in a memory system using an execution log. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, memory units formed based on negative-and (NAND) logic gates, memory units formed based on negative-or (NOR) logic gates, etc. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system in the present disclosure.

In the memory system workloads can be measured using an execution log for load balancing and for improved overall performance. For example, the memory system can include a number of processors. Each of the processors can run firmware to perform at least one predefined type of tasks controlled by a task manager. Each task manager and/or processor can store an activity record in the execution log for each time slot. A typical activity record identifies the task manager that is being executed in a processor during the time slot. The activity record indicates whether a task controlled by the task manager is actively being performed in the processor during the time slot. When there is no such an active task being executed in a time slot, the activity record can be configured and/or recognized as an idle record; and the task manager and/or the processor is considered to be in the idle state in the time slot corresponding to the idle record. A workload manager of the memory system can analyze the execution log to count the idle records of different task managers for a time period having multiple time slots. The counts of idle records in the time period can be used by the workload manager to determine/estimate the workloads of different types of tasks and/or the workloads of the processors. Based on the workloads determined/estimated from the execution log, the workload manager can re-balance the workloads of the processors. For example, the workload manage may adjust the numbers of running task managers, the allocations of running task managers in different processors, and/or the distributions of tasks of a same type to different task managers of the same type running on different processors.

Figure 1:
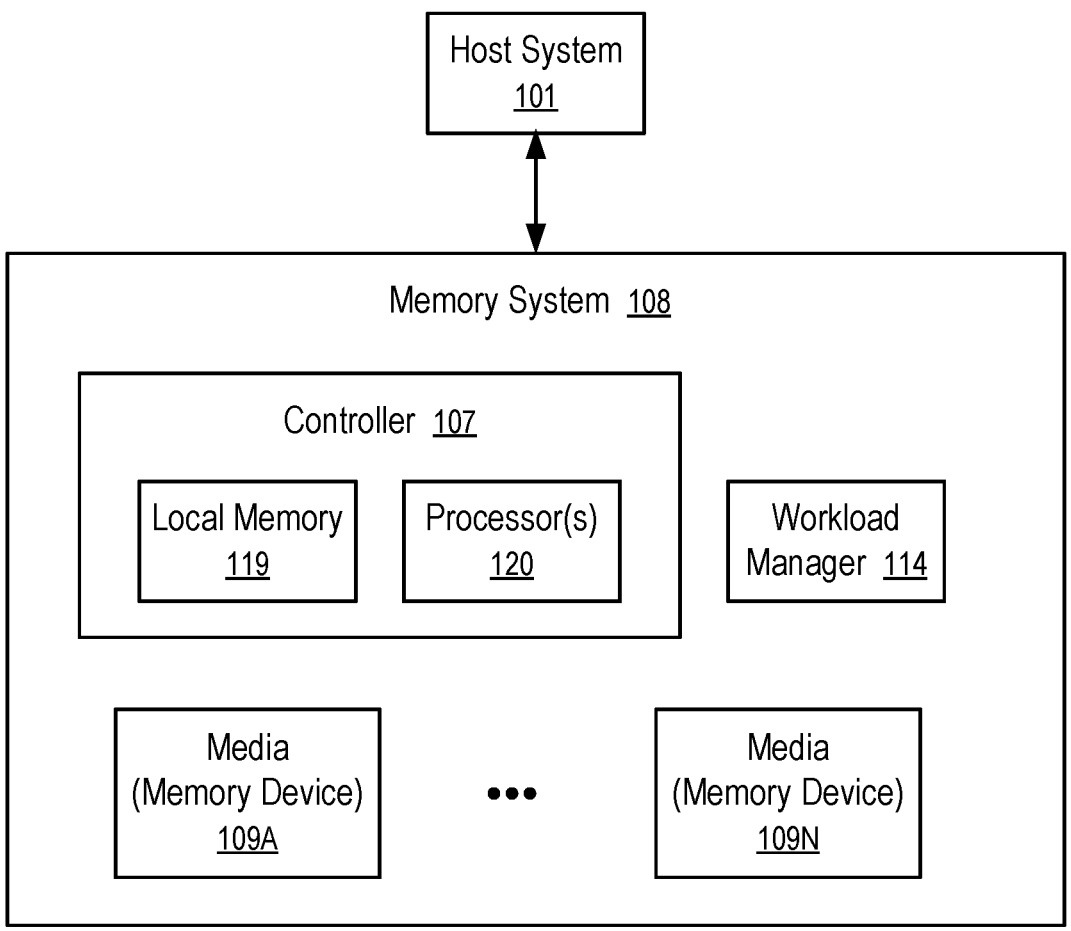
FIG. 1 shows a computing system having a memory system having a workload manager in accordance with some embodiments of the present disclosure.

FIG. 1 shows a computing system having a memory system (108) having a workload manager (114) in accordance with some embodiments of the present disclosure.

For example, the workload manager (114) can count the number of idle time slots within a time period for each processor (120) of a controller (107) of the memory system (108) to identify some of the processors (120) that have slack capacity to take on additional tasks and some of the processors (120) that may be currently overloaded with tasks. A processor having a large number of idle time slots has more slack capacity than a processor having a small number of idle time slots; and a processor having no idle time slots may have excessive workloads. Each of the processors can run one or more task managers of the memory system (108); and different task managers may run on a same processor; and task managers of a same type may run on more than one processor (120) to process tasks of the same type. The workload manager (114) can balance workloads among the processors (120) by adjusting the distributions of the running task managers in the processors (120) and/or the ratios of distributing tasks of a same type to tasks managers running in different processors to evenly distribute the idle time slots among the processors (120) and/or reduce or eliminated idle time slots in a subsequent time period.

In general, the memory system (108) can include media, such as memory devices (109A to 109N). The memory devices (109A to 109N) can be volatile memory devices, non-volatile memory (NVM) devices, or a combination of such. In some embodiments, the memory system (108) is a storage system. An example of a storage system is a solid state drive (SSD). In some embodiments, the memory system (108) is a hybrid memory/storage system. In general, the computing system can include a host system (101) that uses the memory system (108). In some implementations, the host system (101) can write data to the memory system (108) and read data from the memory system (108).

The host system (101) can be a computing device such as a desktop computer, laptop computer, network server, mobile device, or such computing device that includes a memory and a processing device. The host system (101) can include or be coupled to the memory system (108) so that the host system (101) can read data from or write data to the memory system (108). The host system (101) can be coupled to the memory system (108) via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc. The physical host interface can be used to transmit data between the host system (101) and the memory system (108). The host system (101) can further utilize an NVM Express (NVMe) interface to access the memory devices (109A to 109N) when the memory system (108) is coupled with the host system (101) by the PCIe interface. The physical host interface can provide an interface for passing control, address, data, and other signals between the memory system (108) and the host system (101).

The memory devices (109A to 109N) can include any combination of the different types of non-volatile memory devices and/or volatile memory devices. An example of non-volatile memory devices includes a negative-and (NAND) type flash memory. Each of the memory devices (109A to 109N) can include one or more arrays of memory cells such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system (101). Although non-volatile memory devices such as NAND type flash memory are described, the memory devices (109A to 109N) can be based on any other type of memory such as a volatile memory. In some implementations, the memory devices (109A to 109N) can be, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices (109A to 109N) can be grouped as memory pages or data blocks that can refer to a unit of the memory device used to store data.

The controller (107) can communicate with the memory devices (109A to 109N) to perform operations such as reading data, writing data, or erasing data at the memory devices (109A to 109N) and other such operations. The controller (107) can include hardware such as one or more integrated circuits and/or discrete components, a buffer memory, or a combination thereof. The controller (107) can be a microcontroller, special purpose logic circuitry (e.g., a field programmable gate array (FPGA), an application specific integrated circuit (ASIC), etc.), or another suitable processor. The controller (107) can include one or more processors (processing devices) (120) configured to execute instructions stored in local memory (119).

In the illustrated example, the local memory (119) of the controller (107) includes an embedded memory configured to store instructions for performing various processes, operations, logic flows, and routines that control operation of the memory system (108), including handling communications between the memory system (108) and the host system (101), and the functions of the workload manager (114), which is described in greater detail below. In some embodiments, the local memory (119) can include memory for the implementation of the workload manager (114) and/or memory registers storing, e.g., memory pointers, fetched data, etc. The local memory (119) can include read-only memory (ROM) for storing micro-code.

While the example memory system (108) in FIG. 1 has been illustrated as including the controller (107), in another embodiment of the present disclosure, a memory system (108) may not include a controller (107), and may instead rely upon external control (e.g., provided by an external host, or by a processor or controller separate from the memory system).

In general, the controller (107) can receive commands or operations from the host system (101) and can convert the commands or operations into instructions or appropriate commands to achieve the desired access to the memory devices (109A to 109N). The controller (107) can be responsible for other operations such as wear leveling operations, garbage collection operations, error detection and error-correcting code (ECC) operations, encryption operations, caching operations, and address translations between a logical block address and a physical block address that are associated with the memory devices (109A to 109N). The controller (107) can further include host interface circuitry to communicate with the host system (101) via the physical host interface. The host interface circuitry can convert the commands received from the host system into command instructions to access the memory devices (109A to 109N) as well as convert responses associated with the memory devices (109A to 109N) into information for the host system (101).

The memory system (108) can also include additional circuitry or components that are not illustrated. In some implementations, the memory system (108) can include a cache or buffer (e.g., DRAM) and address circuitry (e.g., a row decoder and a column decoder) that can receive an address from the controller (107) and decode the address to access the memory devices (109A to 109N).

In one example, the host system (101) has one or more connectors to provide the memory system (108) with power and/or communicate with the memory system (108) via a communication channel and a predetermined protocol; and the memory system (108) has one or more connectors to receive the power, data and commands from the host system (101). For example, the connection between connector on the host system (101) and connector on memory system (108) may utilize a PCIe bus or a SATA bus.

Figure 2:
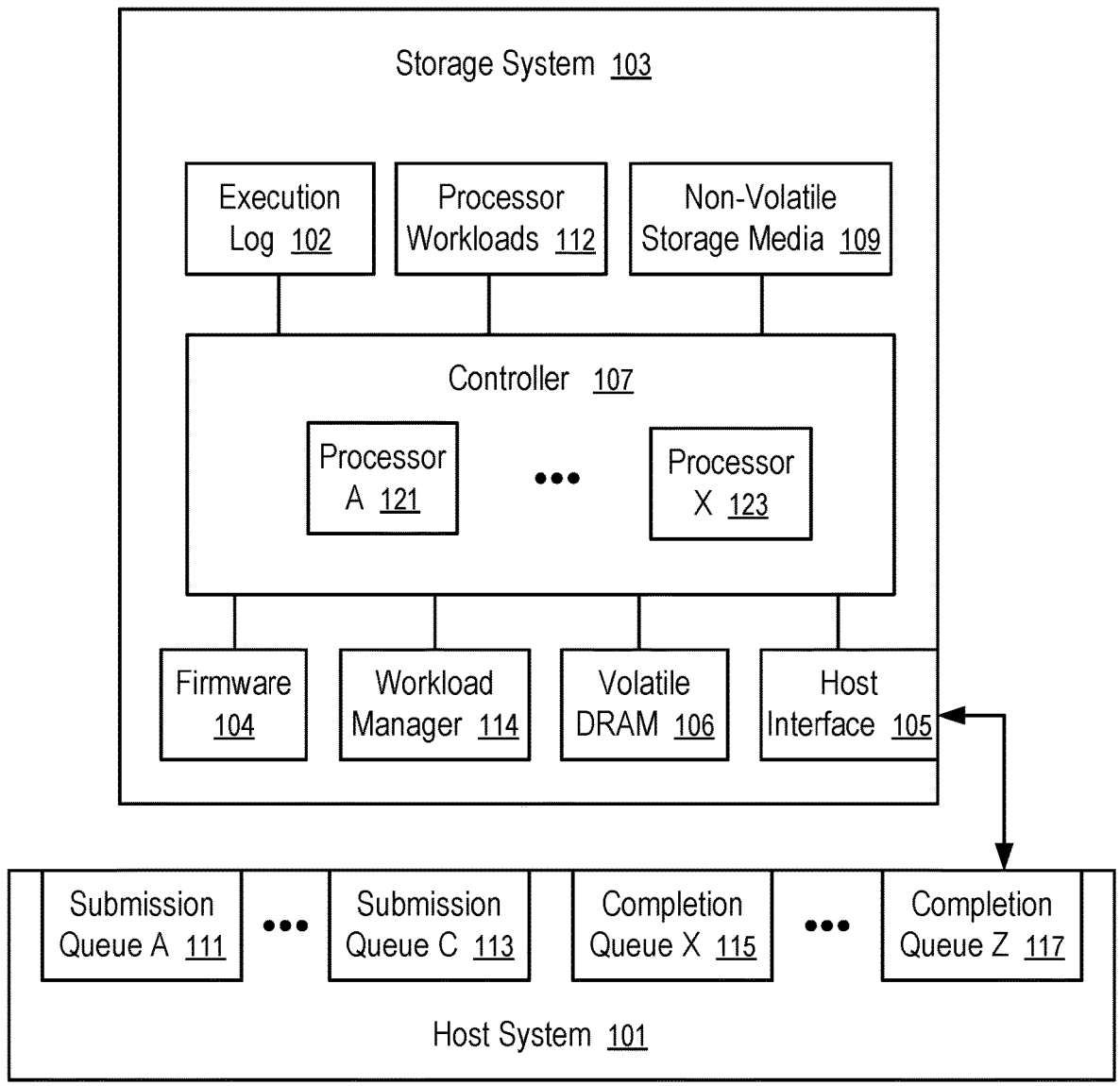
FIG. 2 shows a storage system configured to measure and balance workloads using an execution log.

FIG. 2 shows a storage system (103) configured to measure and balance workloads using an execution log (102). For example, the storage system (103) of FIG. 2 can be used as an example of the memory system (108) in the computing system of FIG. 1.

The storage system (103) of FIG. 2 has a controller (107) executing firmware (104) to store data in or retrieve data from non-volatile storage media (109) using resources, such as volatile memory (106), registers, stacks, inter-process communication channels, in response to requests/commands communicated from the host system (101) via a host interface (105).

The controller (107) has a plurality of processors (121, ..., 123) that can be configured via the firmware (104) to run a plurality of processes that perform respectively a plurality of predefined types of tasks. Each type of tasks provide a core functionality of the storage system (103). Optionally, each process running a processor (e.g., 121) to perform a type of tasks is controlled by a respective task manager running the process (e.g., 121) in the controller (107).

For example, a flash translation layer manager can perform a type of tasks of translating a logical address to a physical address usable to address a memory unit in the non-volatile storage media (109).

For example, an input/output manager can perform a type of tasks of accessing the non-volatile storage media (109) to store data or retrieve data using a physical address.

For example, an administrative manager can perform a type of tasks of processing administrative commands, such as the creation or deletion of a namespace, the allocations of resources, etc.

In some instances, a manager (e.g., a flash translation layer manager or an input/output manager) may have multiple, parallel running instances in multiple processors (e.g., 121 and 123). For example, multiple instances of the input/output manager can run in multiple processors (e.g., 121 and 123) respectively; and the multiple processors (e.g., 121 and 123) are configured to run the input/output manager to provide input/output services in parallel.

In some instances, multiple different managers can run in a same processor (e.g., 121) through time sharing of the processor (e.g., 121).

The storage system (103) has an execution log (102) that may be stored in the volatile memory (106) and/or a reserved portion of the non-volatile storage media (109). The execution log (102) contains records indicative the activities of the managers running in the controller (107) of the storage system (103) during each time slot.

In general, a time slot can include a predefined number of clock cycles.

In some implementations, when multiple managers run in a processor (e.g., 121), different managers are active in the processor (e.g., 121) in different time slots; and different managers do not share a time slot on the processor (e.g., 121). Such an implementation reduces the complexity in tracking the workloads.

In other implementations, a time slot may include a sufficiently large number of clock cycles such that, when multiple managers run in a processor (e.g., 121), different managers share the time slot on the processor (e.g., 121) according to a predetermined ratio. The ratio can be used in the determination of the workload of the processor (e.g., 121) based on the workloads of the managers running in the processor (e.g., 121).

In further implementations, multiple managers run in a processor (e.g., 121) may not share a time slot according to a predetermined ratio, but share a number of time slots of on the processor (e.g., 121) substantially according to a predetermined ratio. With an increasing number of time slots, the ratio of the clock cycles used by the different managers approaches increasingly close to the predetermined ratio, which allowed the estimate of the workloads of the processor (e.g., 121) based on the usage of the time slots used by the managers.

Optionally, when multiple managers run in a processor (e.g., 121), the processor (e.g., 121) dynamically adjusts the time sharing of the processor (e.g., 121) among the multiple managers to minimize idle time.

Each of the processors (e.g., 121, ..., 123) can store an activity record in the execution log for a time slot, where the activity record identifies the active manager(s) in the time slot. When the processor (e.g., 121) is in an idle state in the time slot, the activity record does not identify a task manager; and such an activity record can be identified as an idle record of the processor (e.g., 121) in the time slot.

Optionally, when a processor (e.g., 121) is in an idle state, an idle manager becomes active in the processor (e.g., 121) and generates the idle record for a time slot. Optionally, the idle manager may perform tasks that are scheduled for processing at an idle time, such as Idle Time Garbage Collection in solid state drives, customized commands, and low priority commands.

Examples and details of customized commands executed in idle time can be found in U.S. patent application Ser. No. 15/893,249, filed Feb. 9, 2018 and entitled "Data Storage Device Idle Time Processing," the entire disclosure of which application is hereby incorporated herein by reference.

Examples and details of low priority commands executed in idle time can be found in U.S. patent application Ser. No. 15/908,261, filed Feb. 28, 2018 and entitled "Latency-based Scheduling of Command Processing in Data Storage Devices," the entire disclosure of which application is hereby incorporated herein by reference.

Optionally, each manager running in a processor (e.g., 121) records an activity record in the execution log (102) while the manager is active in a time slot. The lack of an activity record is an indication of the idle/inactive state of the manager in the time slot on the processor (e.g., 121).

Processor workloads (112) can be determined/estimated for a time period that includes a plurality of time slots. Based on the activity records in the time period in the execution log (102), the workload manager (114) counts the idle time slots in the time period for the processors (e.g., 121, ..., 123) and/or the idle time slots of the managers configured on the processors (e.g., 121, ..., 123). The percentages of the idle time slots in the time period are indicative of the workloads (112) of the processors (121, ..., 123).

After determining the processor workloads (112) for one or more past time periods, the workload manager (114) can re-balance the workload distribution for a next time period. For example, the workload for the next time period may be predicted based on one or more past time periods. The predicted workload can be redistributed via: the adjusting the allocations of running managers across the processors (121, ..., 123), the time share ratios of different managers running on a same processor (e.g., 121), and/or the division of tasks of a same type to instances of a task manager running in different processors (e.g., 121, 123).

The workload manager (114) can periodically poll the processors (121, ..., 123) to generate the activity records in the execution log (102).

Alternatively, the processors (121, ..., 123) are provided with opportunities to write activity records in the execution log (102) one at a time. For example, a token can be passed from one processor. A processor (e.g., 121) having the token is allowed to write an activity record in the execution log (102) and is required to pass the token to a next processor after a predetermined period of time.

Alternatively, separate execution logs are allocated to the processors (121, ..., 123); and the workload manager (114) uses the separate execution logs as the execution log (102) in determining the processor workloads (112).

In some implementations, each manager is to record in the execution log (102) the beginning of a time period to perform a task and the end of the time period to perform the task. The active time periods as recorded in the execution log (102) can be used to determine the idle/inactive time periods of the manager.

In general, the host system (101) can use message queues to submit requests/commands that are processed by the task managers running in the processors (121, ..., 123).

For example, a submission queue (e.g., 111, ..., or 113) can be used by the host system (101) to submit requests to the storage system (103); and a completion queue (e.g., 115, ..., or 117) can be used by the host system (101) to receive responses from the storage system (103).

For example, a version of NVMe (e.g., Non-Volatile Memory Host Controller Interface Specification 1.2) specifies the use of a circular buffer with a fixed slot size for a submission queue (e.g., 111, ..., or 113) or a completion queue (e.g., 115, ..., or 117).

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage system (103), commands to write data into the storage system (103), commands to compare data in the storage system (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the storage system (103) fetch the commands/requests from a submission queue (111, ..., or 113) according to the order in which the commands are placed in the submission queue (111, ..., or 113). However, the NVMe allows the controller (107) to execute the fetched commands in any order.

Figures 3, 4:
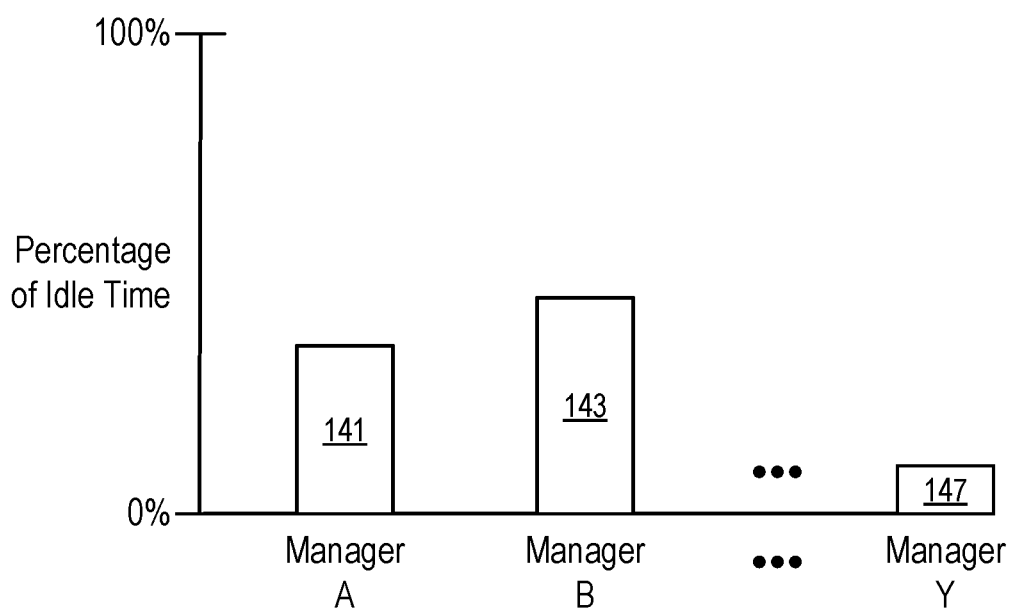
FIG. 3 illustrates an execution log.
FIG. 4 illustrates percentages of idle time determined from an execution log.

FIG. 3 illustrates an execution log (102). For example, the execution log (102) of FIG. 3 can be used by the workload manager (114) of FIG. 1 and/or FIG. 2 to determine the workloads of processors (e.g., 120, or 121 to 123).

The execution log (102) contains a plurality of activity records. For example, one activity record identifies a time (131) at which a manager (133) performs a task (135); and another activity record identifies a time (132) at which a manager (134) performs a task (136)

In some instances, the activity records identify the task managers (e.g., 133, 134, ...) to allow the workload manager (114) to determine the idle time slots in a time period where the time slots allocated to the idling tasks managers can be reallocated to a portion of tasks assigned to other tasks managers that may not have enough time slots to process their workloads.

In some instances, the activity records identify the task managers (e.g., 133, 134, ...) are identified in a way that allows the determination of a processor (e.g., 121, ..., or 123) on which the task managers (e.g., 133, 134, ...) are configured.

In some implementations, each of the activity records includes an additional field to explicitly identify the processor (e.g., 121, ..., or 123) on which the respective task managers (133, 134, ..., ) are configured.

Alternatively, the activity records includes a field to explicitly identify the processor (e.g., 121, ..., or 123) on which the respective task managers (133, 134, ..., ) are configured; and the task managers (133, 134, ..., ) can be derived from the tasks (e.g., 135, ..., 136). Thus, the task managers (133, 134, ..., ) do not need to be identified explicitly.

In some implementations, the tasks (e.g., 135, 136, ...) allow the workload manager (114) to determine whether the processor (e.g., 121, ..., or 123) on which the task manager (e.g., 133 or 134) configured is idle or not at the corresponding time (131, or 132). The tasks (e.g., 135, 136, ...) can include additional details of the requests/commands from the host system (101). For example, an input/output manager can handle multiple types of input/output requests (e.g., read, write, erase); and the tasks (e.g., 135, 136, ...) identify the type of requests/commands from the host system (101) and being processed by the respective manager (e.g., 133, 134, ...) at the respective time (e.g., 131, 132).

In some implementations, a predetermined code is used in the task field (e.g., 135, 136, ...) to indicate that the manager (e.g., 133, 134, ...) in the respective processor (e.g., 121, ..., 123) is idling in the time slot (e.g., 131, 132, ...).

In some implementations, a set of codes can be used to identify different tasks performed during idle time, such as garbage collection, customized commands, and low priority commands.

Alternatively, each of the activity records is used to identify an active time slot; and the idle time slots can be determined from the lack of corresponding records in the execution log (102).

FIG. 4 illustrates percentages (141, 143, ..., 147) of idle time determined from an execution log. For example, the percentages (141, 143, ..., 147) of idle time illustrated in FIG. 4 can be determined from the execution log (102) of FIG. 3 by the workload manager (114) of FIG. 1 and/or FIG. 2 to determine the workloads of processors (e.g., 120, or 121 to 123).

After identifying, from the execution log (102), the time slots during which managers are idling in a time period that has a known number of time slots, the workload manager (114) can compute the percentages (141, 143, ..., 147) of idle time during the time period. The percentages (141, 143, ..., 147) of idle time during the time period are computed for different types of workload managers. The idle time percentages (141, 143, ..., 147) allow the workload manager (114) to re-balance resource allocations to the different types of workload managers to reduce idle times in the controller (107) and thus improve the overall performance of the storage system (103).

Similarly, after identifying, from the execution log (102), the time slots during which processors (121, . . . , 123) are idling in a time period that has a known number of time slots, the workload manager (114) can compute the percentages of idle time during the time period of the processors (121, . . . , 123), which are indicative of the processor workloads (112). The processor workloads (112) allow the workload manager (114) to re-balance workload allocations among the processors (121, . . . , 123) to reduce idle times in the controller (107) and thus improve the overall performance of the storage system (103).

For example, the workload manager (114) may configure one of the processor (e.g., 121) to run an additional manager to perform the same type of tasks of a manager configured on another processor (e.g., 123) that have no idle time slot (or having a lowest number of idle time slots, or having a lower than a threshold number of idle time slots) during the time period. Thus, the lightly-loaded processor (e.g., 121) may process a share of workload that would otherwise be allocated to the heavily-loaded processor (e.g., 123). In some instances, the workload manager (114) computes and/or adjusts a workload share ratio between the processors (e.g., 121, 123) in processing the same type of tasks, such that the idle time slots are substantially evenly distributed among the processors (121, . . . , 123), or the idle time slots are eliminated.

Figure 5:
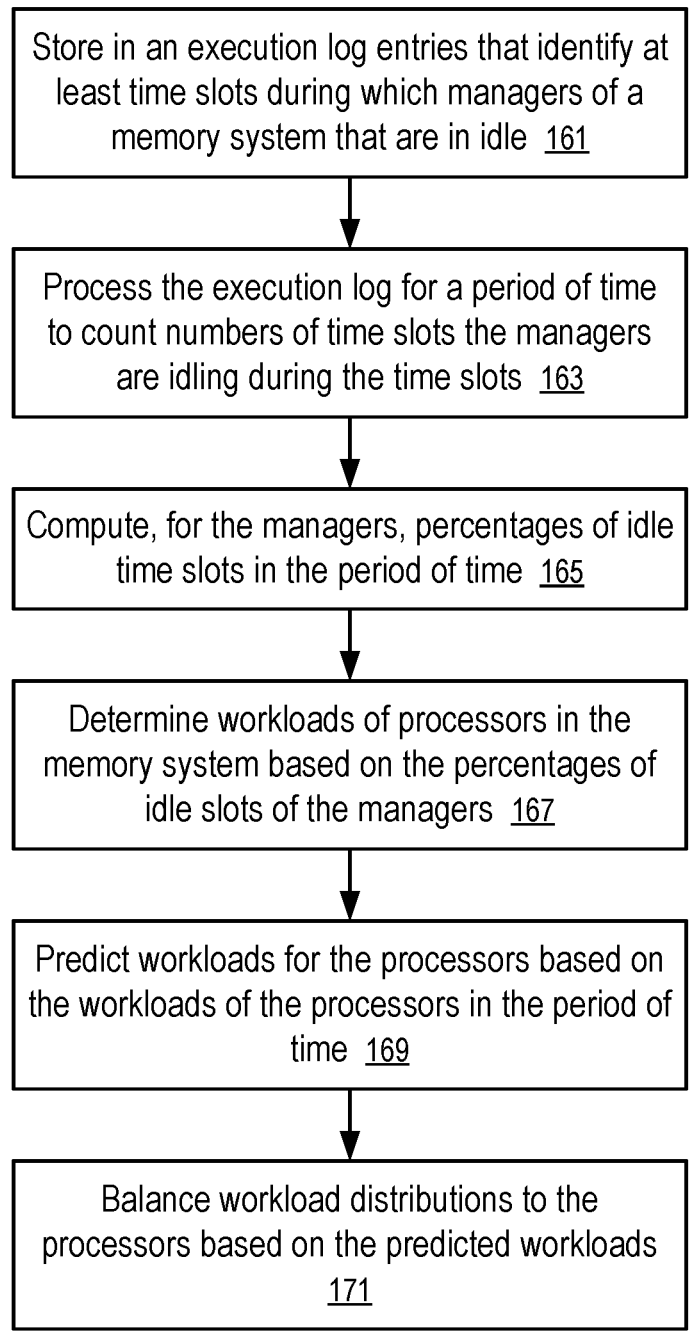
FIG. 5 shows a method to determine and balance workloads in a memory system.

FIG. 5 shows a method to determine and balance workloads in a memory system. For example, the method of FIG. 5 can be used in the memory system (108) of FIG. 1 in general and in the storage system (103) of FIG. 2 as an example, using the execution log (102) of FIG. 3 and the percentages (141, 143, . . . , 147) of idle time of FIG. 4

The method of FIG. 5 includes: storing (161) in an execution log (102) entries that identify at least time slots during which managers of a memory system (108 or 103) that are in idle; processing (163) the execution log (102) for a period of time to count numbers of time slots the managers are idling during the time slots in the period of time; computing (165), for the managers, percentages (141, 143, . . . , 147) of idle time slots in the period of time; determining (167) workloads (112) of processors (121, . . . , 123) in the memory system (108 or 103) based on the percentages (141, 143, . . . , 147) of idle slots of the managers; predicting (169) workloads for the processors (121, . . . , 123) based on the workloads (112) of the processors (121, . . . , 123) in the period of time; and balancing (171) workload distributions to the processors (121, . . . , 123) based on the predicted workloads.

For example, a memory system (e.g., 108 or 103) includes a set of media (e.g., 109A to 109N or 109); and a controller (107) having a plurality of processors (e.g., 120 or 121 to 123). The processors (e.g., 120 or 121 to 123) are configured to perform tasks to process requests from a host system (101) to store data in the media (e.g., 109A to 109N or 109) or retrieve data from the media (e.g., 109A to 109N or 109).

In the memory system (e.g., 108 or 103), a workload manager (114) analyzes activity records in an execution log (102) for a time period, identifies idle time slots within the time period during which time slots one or more first processors (e.g., 121) in the plurality of processors (e.g., 121 to 123) are in idle, and adjusts a configuration of the controller (107) to direct tasks from one or more second processors (e.g., 123) to the one or more first processors (e.g., 121). Each of the activity records can indicate whether a processor (e.g., 121) of the controller (107) is in an idle state during a time slot in the time period.

For example, the set of media includes a flash memory; and the memory system is a solid state drive.

For example, the workload manager (114) identifies the one or more second processors (e.g., 123) as having no idle time slots in the time period, and/or having fewer idle time slots in the time period than the one or more first processors (e.g., 121).

The workload manager (114) determines workloads (112) of the plurality of processors based on percentages of idle time slots in the time period.

For example, each of the processors (e.g., 121 to 123) has one or more running instances of task managers of different types; and the workload manager counts idle time slots of the running instances to estimate workloads of different types of tasks.

For example, the workload manager (114) balances idle time slots among the plurality of processors and/or reduces or eliminates a total idle time slots among the plurality of processors by adjusting the configuration.

For example, the workload manager (114) adjusts the configuration by adding, in the one or more first processors (121), a running instance of a task manager that has a running instance in the one or more second processors.

For example, the workload manager (114) adjusts the configuration by changing a ratio for assigning tasks between a running instance of a task manager in the one or more first processors (e.g., 121) and a running instance of the task manager in the one or more second processors (e.g., 123).

Examples of tasks managers include a flash translation layer manager, an input/output manager, an administrative manager, etc.

In some instances, multiple idle task managers are used to perform different types of tasks during idle time, such as garbage collection, customized commands, low priority commands.

The storage system (103) of FIG. 2 can be attached to the host system (101) in FIG. 1 as an implementation of the memory system (108). A communication channel between the host system (101) and the memory system (108) in general and the storage system (103) in particular allows the host system (101) to send data requests and/or other commands that trigger certain operations of the controller (107) on the media (e.g., 109A to 109N, 109), such as data write operations, data read operations, data erasure operations. A host interface (105) implements the communication protocols of the communication channel.

In some implementations, the communication channel between the host system (101) and the memory system (108) or the storage system (103) includes a bus for computer peripheral devices, such as a PCIe bus, a SATA bus, a USB bus.

In some implementations, the communication channel between the host system (101) and the storage system (103) includes a computer network, such as a local area network, a wireless local area network, a wireless personal area network, a cellular communications network, a broadband high-speed always-connected wireless communication connection (e.g., a current or future generation of mobile network link); and the host system (101) and the storage system (103) can be configured to communicate with each other using data storage management and usage commands similar to those in NVMe protocol.

The controller (107) of the storage system (103) can run firmware (104) to perform operations responsive to the communications from the host system (101). Firmware in general is a type of computer program that provides control, monitoring and data manipulation of engineered computing devices.

The storage system (103) can have non-volatile storage media (109). Examples of non-volatile storage media (109) include memory cells formed in an integrated circuit and magnetic material coated on rigid disks. Non-volatile storage media (109) can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors (121, . . . , 123), each having its own in-processor cache memory.

Optionally, the controller (107) performs data intensive, in-memory processing using data and/or instructions organized in the storage system (103). For example, in response to a request from a host system (101), the controller (107) performs a real time analysis of a set of data stored in the storage system (103) and communicates a reduced data set to the host system (101) as a response. For example, in some applications, the storage system (103) is connected to real time sensors to store sensor inputs; and the processors (120, 121, . . . , 123) of the controller (107) are configured to perform machine learning and/or pattern recognition based on the sensor inputs to support an artificial intelligence (AI) system that is implemented at least in part via the storage system (103) and/or the host system (101).

In some implementations, the processors (120, 121, . . . , 123) of the controller (107) are integrated with memory (e.g., 119, 109A, . . . , 109N, 106, 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The storage system (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller (107) can be implemented using computer instructions executed by the controller (107), such as the firmware (104) of the controller (107). In some instances, hardware circuits can be used to implement at least some of the functions. The firmware (104) can be initially stored in the non-volatile storage media (109), or another non-volatile device, and loaded into the volatile DRAM (106) and/or the in-processor cache memory for execution by the controller (107).

A non-transitory computer storage medium can be used to store instructions of the firmware (104) of the memory system (108) in general and the storage system (103) in particular. When the instructions are executed by the controller (107) of the memory system (108) or the storage system (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory system, comprising:
   a set of media; and
   a controller having a plurality of processors, configured to perform tasks to process requests from a host system to store data in the media or retrieve data from the media;
   wherein a workload manager analyzes activity records in an execution log for a time period, identifies idle time slots within the time period during which time slots one or more first processors in the plurality of processors are in idle state, and adjusts a configuration of the controller to direct tasks from one or more second processors to the one or more first processors to reduce total idle time slots among the plurality of processors.

2. The memory system of claim 1, wherein the set of media includes a flash memory.

3. The memory system of claim 2, wherein the memory system is a solid state drive.

4. The memory system of claim 1, wherein the workload manager balances idle time slots among the plurality of processors.

5. The memory system of claim 1, wherein the workload manager reduces or eliminates a total idle time slots among the plurality of processors.

6. The memory system of claim 1, wherein each of the processors has one or more running instances of task managers of different types; and the workload manager counts idle time slots of the running instances to estimate workloads of different types of tasks.

7. The memory system of claim 5, wherein the workload manager adjusts the configuration by adding, in the one or more first processors, a running instance of a task manager that has a running instance in the one or more second processors.

8. The memory system of claim 5, wherein the workload manager adjusts the configuration by changing a ratio for assigning tasks between a running instance of a task manager in the one or more first processors and a running instance of the task manager in the one or more second processors.

9. The memory system of claim 1, wherein the workload manager identifies the one or more second processors having fewer idle time slots in the time period than the one or more first processors.

10. The memory system of claim 9, wherein the workload manager determines workloads of the plurality of processors based on percentages of idle time slots in the time period.

11. A method, comprising:
    providing a set of media and a controller in a memory system, the controller having a plurality of processors, configured to perform tasks to process requests from a host system to store data in the media or retrieve data from the media;
    analyzing, by a workload manager of the memory system, activity records in an execution log for a time period, each of the activity records indicating whether a processor of the controller is in an idle state during a time slot in the time period;
    identifying, by workload manager, idle time slots within the time period during which time slots one or more first processors in the plurality of processors are in the idle state; and
    adjusting, by the workload manager, a configuration of the controller to direct tasks from one or more second processors to the one or more first processors to reduce total idle time slots among the plurality of processors.

12. The method of claim 11, wherein the set of media includes a flash memory;
    and the memory system is a solid state drive.

13. The method of claim 11, further comprising:
    balancing or eliminating idle time slots among the plurality of processors.

14. The method of claim 11, wherein each of the processors has one or more running instances of task managers of different types; and method further comprises:

counting idle time slots of the running instances to estimate workloads of different types of tasks.

15. The method of claim 14, wherein the adjusting the configuration includes:

adding, in the one or more first processors, a running instance of a task manager that has a running instance in the one or more second processors.

16. The method of claim 14, wherein the adjusting the configuration includes:

changing a ratio for assigning tasks between a running instance of a task manager in the one or more first processors and a running instance of the task manager in the one or more second processors.

17. The method of claim 11, further comprising:

identifying the one or more second processors having no idle time slots or having fewer idle time slots in the time period than the one or more first processors.

18. The method of claim 17, further comprising:

determining workloads of the plurality of processors based on percentages of idle time slots in the time period.

19. A non-transitory computer storage medium storing instructions which, when executed by a memory system having a set of media and a controller having a plurality of processors, cause the memory system to perform a method, the method comprising:

running instances of task managers of different types in the plurality of processors, each of the task manager configured to perform a type of tasks in processing requests from a host system to store data in the media or retrieve data from the media;

analyzing activity records in an execution log for a time period, each of the activity records indicating whether a processor of the controller is in an idle state during a time slot in the time period; and identifying idle time slots within the time period during which time slots one or more first processors in the plurality of processors are in the idle state;

identifying the one or more second processors having no idle time slots or having fewer idle time slots in the time period than the one or more first processors; and adjusting a configuration of the controller to direct tasks from the one or more second processors to the one or more first processors to reduce or eliminate total idle time slots among the plurality of processors.

20. The non-transitory computer storage medium of claim 19, wherein the method further comprises:

counting idle time slots of the running instances to estimate workloads of the different types of task managers.

* * * * *